United States Patent
Ujjain et al.

(10) Patent No.: US 7,872,974 B2
(45) Date of Patent: Jan. 18, 2011

(54) SYSTEM AND METHOD FOR HANDLING OR AVOIDING DISRUPTIONS IN WIRELESS COMMUNICATION

(75) Inventors: Vijay K. Ujjain, San Diego, CA (US); Pamela A. Cereck, Escondido, CA (US)

(73) Assignee: Freescale Semiconductor Inc., Austin, TX (US)

(\*) Notice: Subject to any disclaimer, the term of this patent is extended or adjusted under 35 U.S.C. 154(b) by 239 days.

(21) Appl. No.: 11/863,135

(22) Filed: Sep. 27, 2007

(65) Prior Publication Data

US 2009/0086627 A1 Apr. 2, 2009

(51) Int. Cl.
*H04L 1/00* (2006.01)

(52) U.S. Cl. .................. 370/235; 370/230; 370/252

(58) Field of Classification Search .............. 370/230, 370/230.1, 231, 232, 233, 234, 235, 236, 370/252, 437, 229
See application file for complete search history.

(56) References Cited

U.S. PATENT DOCUMENTS

| | | | |
|---|---|---|---|
| 6,400,731 B1 * | 6/2002 | Nitta | 370/468 |
| 6,947,407 B2 * | 9/2005 | Ayyagari et al. | 370/342 |
| 7,072,388 B2 * | 7/2006 | Blakeney et al. | 375/219 |
| 2001/0008542 A1 * | 7/2001 | Wiebke et al. | 375/141 |
| 2002/0080725 A1 * | 6/2002 | Bradley | 370/252 |
| 2002/0142772 A1 * | 10/2002 | Hunzinger | 455/436 |
| 2003/0095508 A1 * | 5/2003 | Kadous et al. | 370/252 |
| 2003/0099204 A1 * | 5/2003 | Subrahmanyan et al. | 370/252 |
| 2003/0103470 A1 * | 6/2003 | Yafuso | 370/282 |
| 2004/0054947 A1 * | 3/2004 | Godfrey | 714/707 |
| 2004/0101035 A1 * | 5/2004 | Boer et al. | 375/219 |
| 2004/0228288 A1 * | 11/2004 | Seol et al. | 370/252 |
| 2005/0245197 A1 * | 11/2005 | Kadous et al. | 455/67.13 |

FOREIGN PATENT DOCUMENTS

| | | |
|---|---|---|
| EP | 1 119 137 B1 | 8/2006 |
| EP | 1 708 420 A1 | 10/2006 |
| WO | WO 2006/012211 A2 | 2/2006 |
| WO | WO 2006/024993 A1 | 3/2006 |
| WO | WO 2006/069352 A1 | 6/2006 |

\* cited by examiner

*Primary Examiner*—Chi H. Pham
*Assistant Examiner*—Keviin Mew
(74) *Attorney, Agent, or Firm*—Charles W. Bethards

(57) ABSTRACT

A wireless communication method comprises selecting a cause of a disruption from two or more potential causes of disruptions by associating at least one characteristic of a communication with a device with the selected cause of a disruption and changing a data rate for the communication from an existing data rate to a new data rate based upon the at least one characteristic of the communication.

20 Claims, 4 Drawing Sheets

| RATES |
|---|
| 54 |
| 48 |
| 36 |
| 24 |
| 18 |
| 12 |
| 11 |
| 9 |
| 6 |
| 5.5 |
| 2 |
| 1 |

| RATE | MOVE DOWN THRESHOLD % | MOVE UP THRESHOLD % | CURRENT FER |
|---|---|---|---|
| 54 | 60 | | |
| 48 | 60 | 40 | |
| 36 | 60 | 40 | |
| 24 | 75 | 50 | |
| 18 | 75 | 50 | |
| 12 | 65 | 30 | |
| 11 | 65 | 30 | |
| 9 | 50 | 20 | |
| 6 | 50 | 20 | |
| 5.5 | 50 | 20 | |
| 2 | 50 | 20 | |
| 1 | | 10 | | ium
SYSTEM AND METHOD FOR HANDLING OR AVOIDING DISRUPTIONS IN WIRELESS COMMUNICATION

BACKGROUND OF THE INVENTION

The present invention relates generally to the field of wireless communication and, more particularly, to systems and methods for handling or avoiding disruptions in such communication.

Wireless communication, such as those within wireless networks such as IEEE 802.11, are susceptible to disruptions. Such disruptions may occur as a result of a mobile station moving further away from a base station. Conventional systems accommodate such disruptions by reducing the transmission rate at which the wireless communication takes place. Lower transmission rates may provide improvements in the communication link while requiring longer periods for transmission of packets. While reducing the transmission rate may be the appropriate measure for handling disruptions due to increased distance between the base station and the mobile station, they can actually exacerbate disruptions due to other reasons.

DETAILED DESCRIPTION OF THE PREFERRED EMBODIMENTS

In one aspect of the invention, a wireless communication method comprises selecting a cause of a disruption from two or more potential causes of disruptions by associating at least one characteristic of a communication with a device with the selected cause of a disruption and changing a data rate for the communication from an existing data rate to a new data rate based upon the at least one characteristic of the communication.

In one embodiment, the at least one characteristic of a communication includes a frame error rate. An increase in the frame error rate may be associated with interference from another device as the cause of the disruption. A decrease in the frame error rate may be associated with a path loss to a mobile device.

In one embodiment, the communication is a wireless packet transfer communication.

In one embodiment, the communication is in accordance with IEEE 802.11a, b or g.

The new data rate may be selected from a list of available rates for use in the communication. The list of available rates may be stored in a table. The table may further include threshold values for at least one characteristic, the threshold values being associated with the detection of a disruption.

In another aspect, the invention includes an apparatus. The apparatus comprises a disruption cause selection module adapted to select a cause of a disruption from two or more potential causes of disruptions by associating at least one characteristic of a communication with a device with the selected cause of a disruption and a transmission rate selection module adapted to change a data rate for the communication from an existing data rate to a new data rate based upon the at least one characteristic of the communication.

In another aspect of the invention, a computer program product is embodied in a computer-readable medium and comprises computer code configured to perform the following steps: selecting a cause of a disruption from two or more potential causes of disruptions by associating at least one characteristic of a communication with a device with the selected cause of a disruption and changing a data rate for the communication from an existing data rate to a new data rate based upon the at least one characteristic of the communication.

Figure 1:
FIG. 1 is a block diagram illustrating an exemplary wireless communication system according to an embodiment of the present invention.

Referring to FIG. 1, an embodiment of a wireless communication system in accordance with the present invention is illustrated. The communication system 100 includes a base station 110 which may serve as an access point to a network for one or more mobile stations, such as mobile station 120. In this regard, the base station 110 may be part of a wireless network, such as a wireless local area network (WLAN). Such networks may operate in accordance with one or more communication standards such as, but not limited to, IEEE 802.11a, b and g. Thus, the base station 110 may be a wireless router positioned in a geographic region to provide wireless access to a network to wireless devices within the geographic region.

The mobile station 120 may be one of a variety of wireless communication devices, such as a laptop computer, a personal digital assistant (PDA), a wireless handheld device or a cellular phone, for example. In this regard, the mobile station 120 is equipped with hardware and software to provide wireless communication capability to the mobile station 120. In one embodiment, the mobile station 120 is a laptop computer with a wireless modem which is either embedded in the laptop computer or is externally connected.

Figure 2:
FIGS. 2 and 3 are block diagrams illustrating potential disruptions in communication in the system of FIG. 1.
Figure 3:
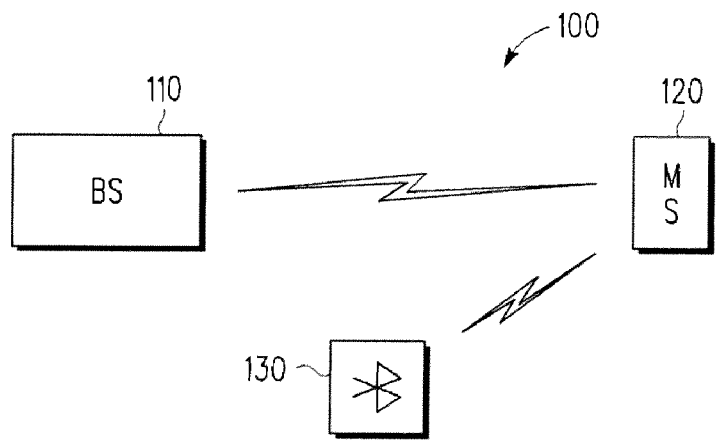

FIGS. 2 and 3 illustrate the communication system 100 of FIG. 1 with examples of potential disruptions in the wireless communication between the base station 110 and the mobile station 120. Referring first to FIG. 2, the communication between the base station 110 and the mobile station 120 may be disrupted due to weakening of the communication link between the base station 110 and the mobile station 120. Such weakening of the communication link may occur due to a reduction in the strength of the signal from the base station 110 being received by the mobile station 120, as may occur if the mobile station is located or moved to a greater distance from the base station 110. The weakening of the communication link may disrupt the wireless communication between the base station 110 and the mobile station 120 since packets transmitted between the station s110, 120 may be lost.

Referring now to FIG. 3, the communication between the base station 110 and the mobile station 120 may be disrupted due to interference with signals from another wireless device. For example, in the embodiment illustrated in FIG. 3, a Bluetooth device 130 in the general vicinity of either the base station 110 or the mobile device 120 may transmit signals that interfere with the communication between the base station 110 and the mobile station 120. In FIG. 3, the Bluetooth device 130 is illustrated as being removed and separate from the mobile station. In other embodiments, the Bluetooth device 130 may be co-located with the mobile station 120.

Disruption handling techniques in conventional wireless communication systems are not sufficiently robust to handle a diversity of disruptions. For example, some conventional systems include algorithms which only address disruptions due to weakening in the signal strength. Any disruption is assumed to be caused due to path loss. In order to handle such disruptions, conventional systems reduce the transmission rate in attempts to improve communication.

Figures 4, 5, 6:
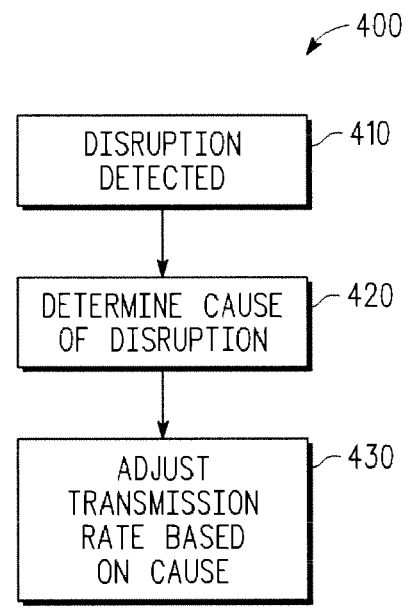
FIG. 4 is a table illustrating available transmission rates in an exemplary IEEE 802.11 wireless network.
FIG. 5 is a flow chart illustrating an exemplary method for handling or avoiding disruptions in wireless communication according to an embodiment of the present invention.
FIG. 6 is an exemplary table for implementation of a system or method according to an embodiment of the present invention.

FIG. 4 illustrates an exemplary table of transmit rates available in certain networks. For example, IEEE 802.11a, b and g standards define the rates at which stations can transmit. As illustrated in FIG. 4, these rates can have discrete values ranging from 1 megabit per second (Mbps) to 54 Mbps.

The base station or the mobile station may select or agree upon one of these rates for transmission. While the higher rates can provide better data throughput to the receiving station, they may increase the chance of disruptions caused by increased distance between the base station and the mobile station. Conversely, using higher data rates may decrease the chance of disruptions caused by interference from other communication devices as a result of the reduced transmission time. On the other hand, using the lower rates reduces data throughput to the receiving station, but may decrease the chance of disruptions caused by increased distance between the base station and the mobile station. Conversely, using lower data rates may increase the chance of disruptions caused by interference from other communication devices as a result of the increased transmission time. Further, for lower rates, a mobile station will consume more power as a result of the power amplifier being turned on for longer durations to transmit the same amount of data as a higher rate.

Thus, algorithms in conventional wireless communication systems may handle a disruption by moving to the next lower transmission rate in FIG. 4. For example, a base station may, upon detection of a disruption, change the transmission rate from 48 Mbps to 36 Mbps.

However, if the disruption is actually due to interference from another device, such as a nearby or co-located Bluetooth device, reducing the transmission rate can exacerbate the problem. For example, Bluetooth and IEEE 802.11 communications use the same 2.4 GHz spectrum and, accordingly, represent potential interference sources for each other. If the transmission rate for the IEEE 802.11 communication is reduced when the disruption is due to such interference, the increase in the transmit time for a packet results in a greater risk of interference causing the packet transfer to be unsuccessful.

In accordance with embodiments of the present invention, a dynamic rate adaptation method may choose the optimal or best available rate for handling or avoiding disruptions in the wireless communications.

Referring now to FIG. 5, a method for handling or avoiding disruptions in wireless communication according to an embodiment of the present invention is illustrated. In accordance with the method 400 of FIG. 5, a disruption is detected (block 410) by, for example, the base station or access point. The disruption may be detected, for example, if an ACK is not received by the base station in response to transmission of a packet.

Upon detection of the disruption, the base station or mobile station attempts to determine the cause of the disruption (block 420). In this regard, the station may analyze certain characteristics of the communication and the disruption. Examples of such analysis are described below with reference to FIGS. 6 and 7. It is noted that determining a cause refers to associating the characteristics of the disruption and communication to a particular cause of the disruption. A cause may be selected from two or more potential causes for the disruption. In this regard, a cause of the disruption may be selected from two or more potential causes of disruptions by associating at least one characteristic of the communication with the selected cause of the disruption.

Next, based on the determined cause, the transmission rate is adjusted either upward, downward or kept the same (block 430). Examples of criteria for adjusting the transmission rate are described below with reference to FIGS. 6 and 7.

In accordance with one embodiment of the invention, a system, method, device or algorithm uses the frame error rate (FER) to detect a disruption and to determine the appropriate adjustment of the transmission rate. Referring now to FIG. 6, an exemplary table for implementation of an embodiment of the present invention is illustrated. Changes in the detected FER can be associated with a particular cause of the disruption, and the transmission rate can be accordingly adjusted. In this regard, each transmission rate is assigned FER thresholds for adjustment in either direction. The use of the thresholds may be in accordance with an implementation such as that described below with reference to FIG. 7. Of course, those skilled in the art will understand that the actual values of FER thresholds illustrated in FIG. 6 are provided only as examples. Various implementations and embodiments may use different threshold values. The "Current FER" is the FER for the current data rate, or the rate at which a rate adaptation scheme converges.

Figure 7:
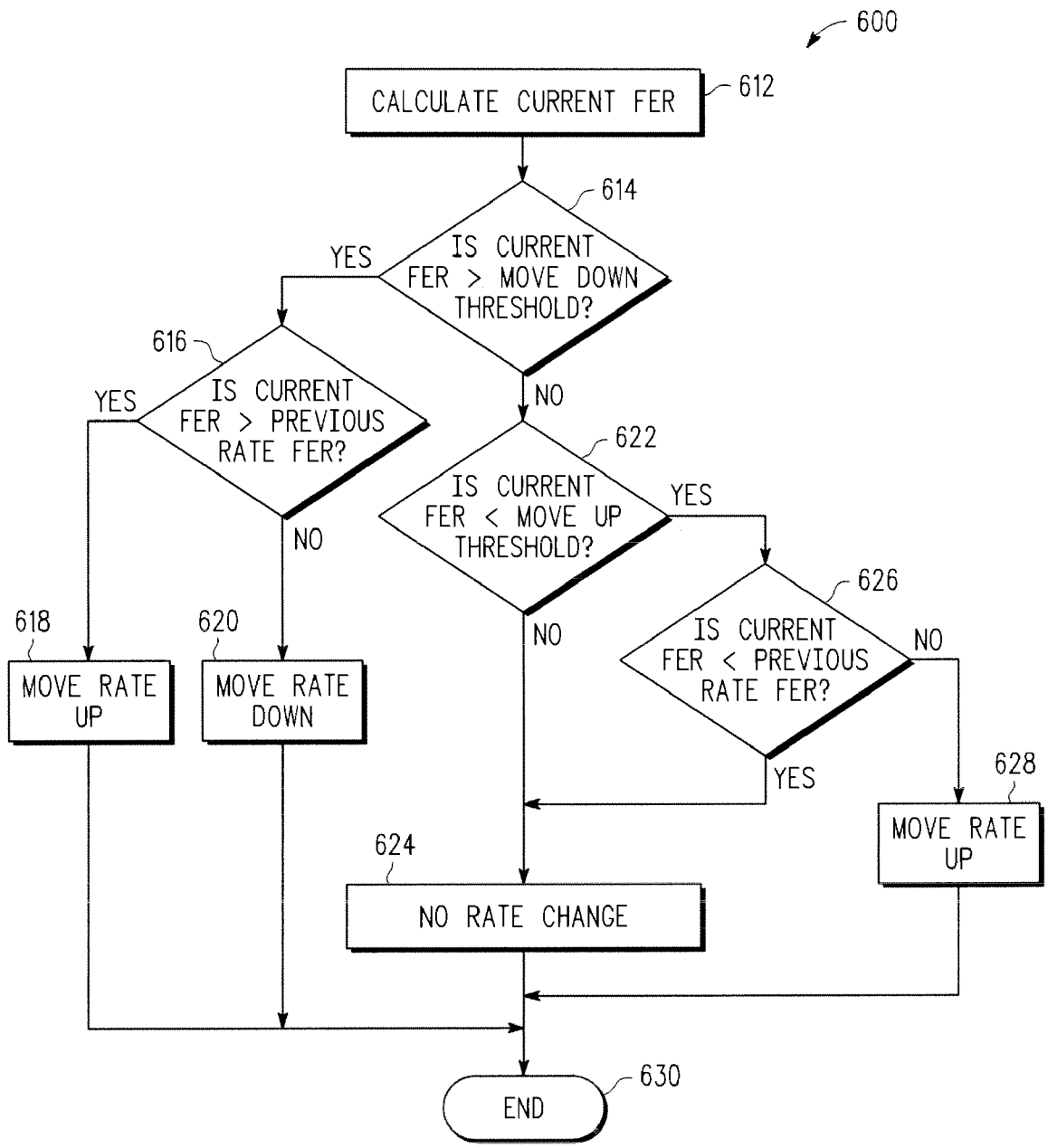
FIG. 7 is a flow chart illustrating an exemplary method for handling or avoiding disruptions in wireless communication according to an embodiment of the present invention.

FIG. 7 is a flow chart illustrating an exemplary method for handling or avoiding disruptions in wireless communication according to an embodiment of the present invention. In accordance with embodiments of the invention, based on a comparison of the current FER with threshold values for the current transmit rate, as illustrated in FIG. 6, a hypothesis is made as to the cause of the disruption. The hypothesis is tested by transmitting the next frame at the rate as indicated by a criteria for adjusting the transmission rate, the criteria being based at least partly on the threshold values. For example, if the current FER is greater than the "Move Down threshold", the hypothesis is tested by transmitting the next frame at a lower transmit rate. The outcome of the test of the hypothesis is fed back into a rate adaptation scheme or algorithm in order to correct the hypothesis, if necessary.

The method 600 of FIG. 7 may be implemented with a table similar to that illustrated in FIG. 6 and may be performed in an apparatus, such as a base station or mobile station, having a processor and a storage device, such as a memory. The table of FIG. 6 may be stored in the storage device. The method 600 may be performed on a frame-by-frame basis. In a preferred embodiment, the new FER replaces the FER from the previous frame as the current FER. In this regard, there may be no weighted average calculation, for example.

At block 612, the current FER is calculated and may be stored. A determination is made as to whether or not the current FER is greater than the "Move Down" threshold of the current transmit rate (block 614). If the determination is made at block 614 that the current FER is greater than the Move Down threshold, the method proceeds to block 616 and determines whether the current FER is greater than the FER for the previous transmission rate. A default position may be set in the event that no previous transmission rate exists, as may be the case for a first detected disruption at block 614. In one embodiment, the default is the same as if the current FER were not greater than the FER for the previous transmission rate.

If the current FER is determined to be greater than the FER for the previous transmission rate at block 616, the disruption is associated with an interference condition. For example, the disruption may be associated with interference from a co-located Bluetooth device. Accordingly, the method 600 proceeds to block 618 and moves the transmission rate upward to the next higher available rate. The higher rate decreases sensitivity of the transmission to interference by decreasing overall transmission time and thus decreases, eliminates or avoids the disruption. The method then proceeds to block 630 and terminates execution for the present frame.

On the other hand, if the determination is made at block 616 that the current FER is not greater than the FER for the previous transmission rate, then the disruption is associated with path loss. Accordingly, the method proceeds to block 620 and moves the transmission rate downward to the next lower available rate. The lower rate provides more robustness in the case of path loss or any degradation of the channel except for interference. In this regard, the current FER may be stored as the "Previous Rate FER" for use in comparison with the FER of the FER at a subsequent lower data rate in future execution of the method 600. The method then proceeds to block 630 and terminates execution for the present frame.

Referring again to the determination at block 614, if the determination is made that the current FER is not greater than the Move Down threshold, the method proceeds to block 622. A determination is then made as to whether the current FER is less than the Move Up threshold (block 622). If the current FER is not less than the Move Up threshold, the method 600 proceeds to block 624 and makes no change to the transmission rate. The method then proceeds to block 630 and terminates execution for the present frame.

If, on the other hand, the determination is made at block 622 that the current FER is less than the Move Up threshold, a further determination is made as to whether the current FER is less than the previous FER (block 626). This determination is made to handle the case where a rate increase from a previous transmission rate results in a greater FER. If the current FER is less than the previous FER, the method 600 proceeds to block 624 and makes no change to the transmission rate. The method then proceeds to block 630 and terminates execution for the present frame.

As implemented in the embodiment of FIGS. 6 and 7, the "Move Down threshold" is the FER threshold at which the transmit rate is lowered to the next lower available rate. Thus, the transmit rate is lowered if the current FER is greater than the "Move Down threshold", pending a comparison with the stored value of "Previous Rate FER." Similarly, the "Move Up threshold" is the FER threshold at which the transmit rate is increased to the next higher available rate. Thus, the transmit rate is increased if the current FER is less than the "Move Up threshold", pending a comparison with the stored value of "Previous Rate FER."

If the determination is made at block 626 that the current FER is not less than the previous FER, the transmission rate is moved upward to the next available higher transmission rate (block 628). The method then proceeds to block 630 and terminates execution for the present frame.

In one embodiment, the device may be provided with a reset feature to prevent stalling of the data transmission rate at a lower data rate than necessary and, thus, consuming more power than necessary. In this regard, if the data rate is not moved up or down for a predetermined number of frames, the reset feature may automatically change the data rate to the next higher available rate. Further, the "Previous Rate FER" may be cleared upon invocation of the reset feature.

Figure 8:
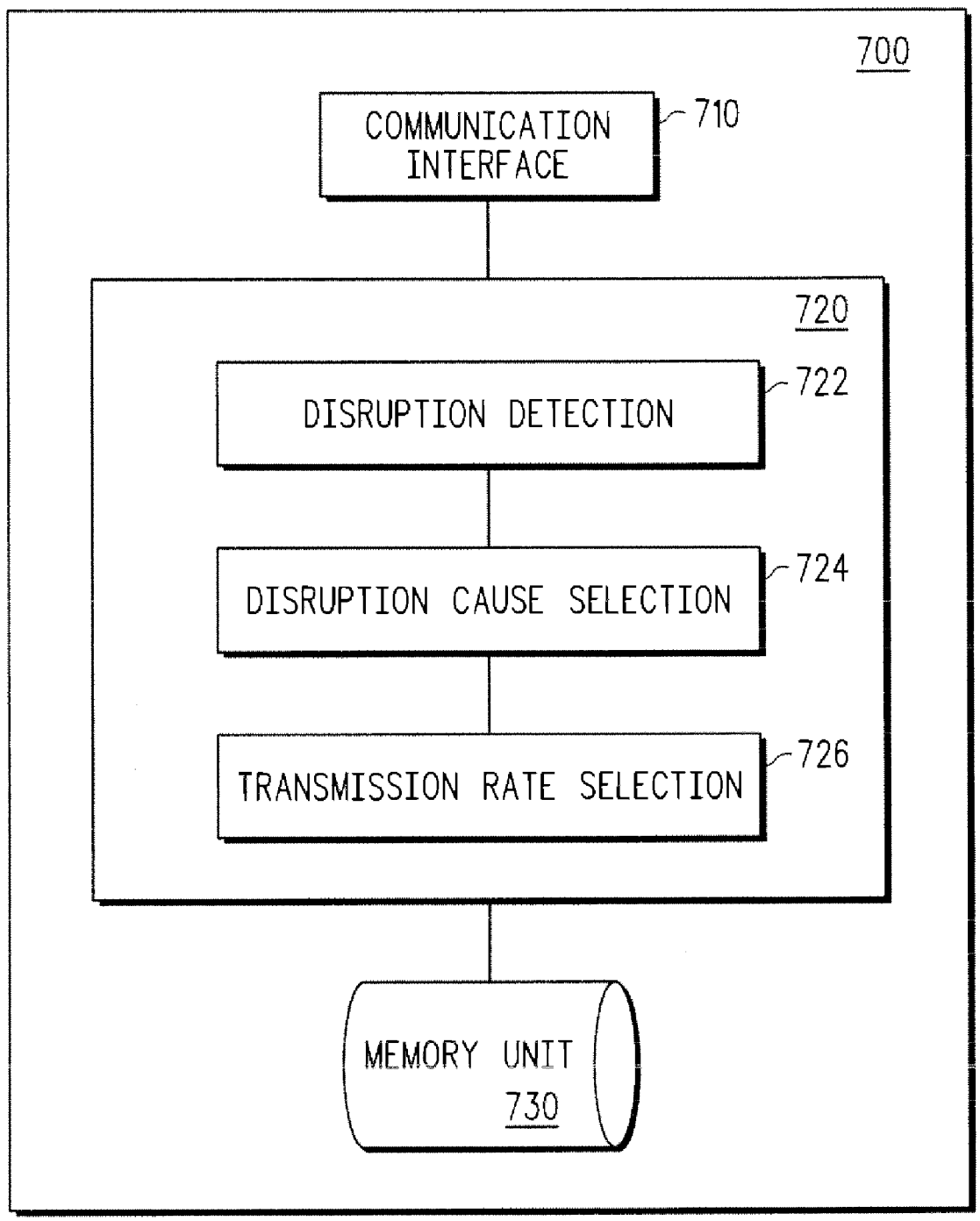
FIG. 8 is a block diagram illustrating an apparatus or device according to an embodiment of the present invention.

Embodiments of the invention may be implemented on any of a number of devices. With reference to FIGS. 1, 2 and 3, embodiments of the invention may be implemented on, for example, either the base station 110 or the mobile station 120. FIG. 8 illustrates a block diagram of a device according to an embodiment of the invention. The device 700 may be any device capable of wireless communication with another device. In this regard, the device 700 is provided with a communication interface 710 to enable communication, for example, in accordance with IEEE 802.11a, b or g.

The device 700 further includes a processor 720 adapted to perform various functions required to be performed by the device 700. In this regard, the processor 720 controls the operation of and accesses the various other components of the device 700. For example, the processor 720 may execute instructions based on computer code stored in a memory unit 730. The computer code stored in the memory unit 730 may include instructions to perform the steps described above with reference to FIGS. 5 and 7, for example.

The processor 720 may be a set of modules adapted to perform functions or steps similar to those described above. For example, as illustrated in the embodiment of FIG. 8, the processor 720 may include a disruption detection module 722, a disruption cause selection module 724 and a transmission rate selection module 726. Each of the modules 722, 724, 726 are communicatively linked to at least one other module. Further, one or more of the modules 722, 724, 726 may be coupled, either directly or indirectly, to the communication interface 710 and/or the memory unit 730. A module 722, 724, 726 may be implemented as a software module, electronic circuitry or any other practical form.

Thus, the disruption detection module 722 may be coupled to the communication interface 710 and may be adapted to detect a disruption. The disruption cause selection module 724 may then determine or select a cause of the disruption from two or more potential causes. In this regard, the disruption cause selection module 724 may be coupled to the memory unit 730 and may access a table similar to that illustrated in FIG. 6. The transmission rate selection module 726 may select a new transmission rate from the available rates based on the disruption cause selected by the disruption cause selection module 724.

Thus, embodiments of the present invention provide a dynamic rate adaptation method for selecting a best available rate for handling or avoiding disruptions in the wireless communications. In one embodiment, the rate is moved upward when the disruption is associated with interference from another device, such as a Bluetooth device. Further, the rate is moved downward when the disruption is associated with a path loss, as may occur due to increased distance between the base station and a mobile station.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A wireless communication method, comprising:
    detecting a disruption of a communication with a device;
    selecting, by a processor, a cause of the disruption from two or more potential causes of disruptions by associating at least one characteristic of the communication with the selected cause of a disruption; and
    changing a data rate for the communication from an existing data rate to a new data rate based upon the selected cause of the disruption.

2. The method according to claim 1, wherein the at least one characteristic of a communication includes a frame error rate.

3. The method according to claim 2, wherein the selecting a cause comprises:
    associating an increase in the frame error rate relative to a frame error rate corresponding to a previous higher data rate with interference from another device as the cause of the disruption.

4. The method according to claim 2, wherein the selecting a cause comprises:
    associating a decrease in the frame error rate relative to a frame error rate corresponding to a previous higher data rate with a path loss to a receiving device as the cause of the disruption.

5. The method according to claim 1, wherein the communication is a wireless packet transfer communication.

6. The method according to claim 1, wherein the communication is in accordance with IEEE 802.11a, b or g.

7. The method according to claim 1, wherein changing a data rate comprises:
    selecting the new data rate from a list of available rates for use in the communication.

8. The method according to claim 7, wherein the list of available rates is stored in a table.

9. The method according to claim 8, wherein the table further includes threshold values for at least one characteristic, the threshold values being associated with the detection of a disruption.

10. The method according to claim 9, wherein the selecting a cause comprises:
    making a hypothesis as to the cause of the disruption based on the current FER calculation being compared to the threshold values in the table.

11. The method according to claim 10, wherein the selecting a cause further comprises:
    testing the hypothesis as to the cause of the disruption by transmitting the next frame at the rate as indicated by a criteria for adjusting the data rate, the criteria being based at least partly on the threshold values.

12. The method according to claim 11, wherein the selecting a cause further comprises:
    feeding an outcome of the test of the hypothesis as to the cause of the disruption back into a rate decision algorithm in order to correct the hypothesis if necessary.

13. The method according to claim 1, further comprising:
    changing the data rate to a higher rate if the data rate does not change after a predetermined number of frames.

14. An apparatus, comprising:
    a detector adapted to determine occurrence of a disruption of a communication with a device:
    a disruption cause selection module adapted to select a cause of the disruption from two or more potential causes of disruptions by associating at least one characteristic of the communication with the selected cause of a disruption; and
    a transmission rate selection module adapted to change a data rate for the communication from an existing data rate to a new data rate based upon the selected cause of the disruption.

15. The apparatus according to claim 14, wherein the at least one characteristic of a communication includes a frame error rate.

16. The apparatus according to claim 15, wherein the disruption cause selection module is adapted to associate an increase in the frame error rate relative to a frame error rate corresponding to a previous higher data rate with interference from another device as the cause of the disruption.

17. The apparatus according to claim 15, wherein the disruption cause selection module is adapted to associate a decrease in the frame error rate relative to a frame error rate corresponding to a previous higher data rate with a path loss to a receiving device as the cause of the disruption.

18. The apparatus according to claim 14, wherein the communication is a wireless packet transfer communication.

19. The apparatus according to claim 14, wherein the communication is in accordance with IEEE 802.11a, b or g.

20. A computer program product, embodied in a non-transitory computer-readable medium, comprising computer code configured to perform the following steps:
    determining an occurrence of a disruption of a communication with a device;
    selecting a cause of the disruption from two or more potential causes of disruptions by associating at least one characteristic of the communication with the selected cause of a disruption;
    changing a data rate for the communication from an existing data rate to a new data rate based upon the selected cause of the disruption.

* * * * *